(No Model.) 3 Sheets—Sheet 1.
T. KENNEDY.
WATER CLOSET.
No. 341,247. Patented May 4, 1886.
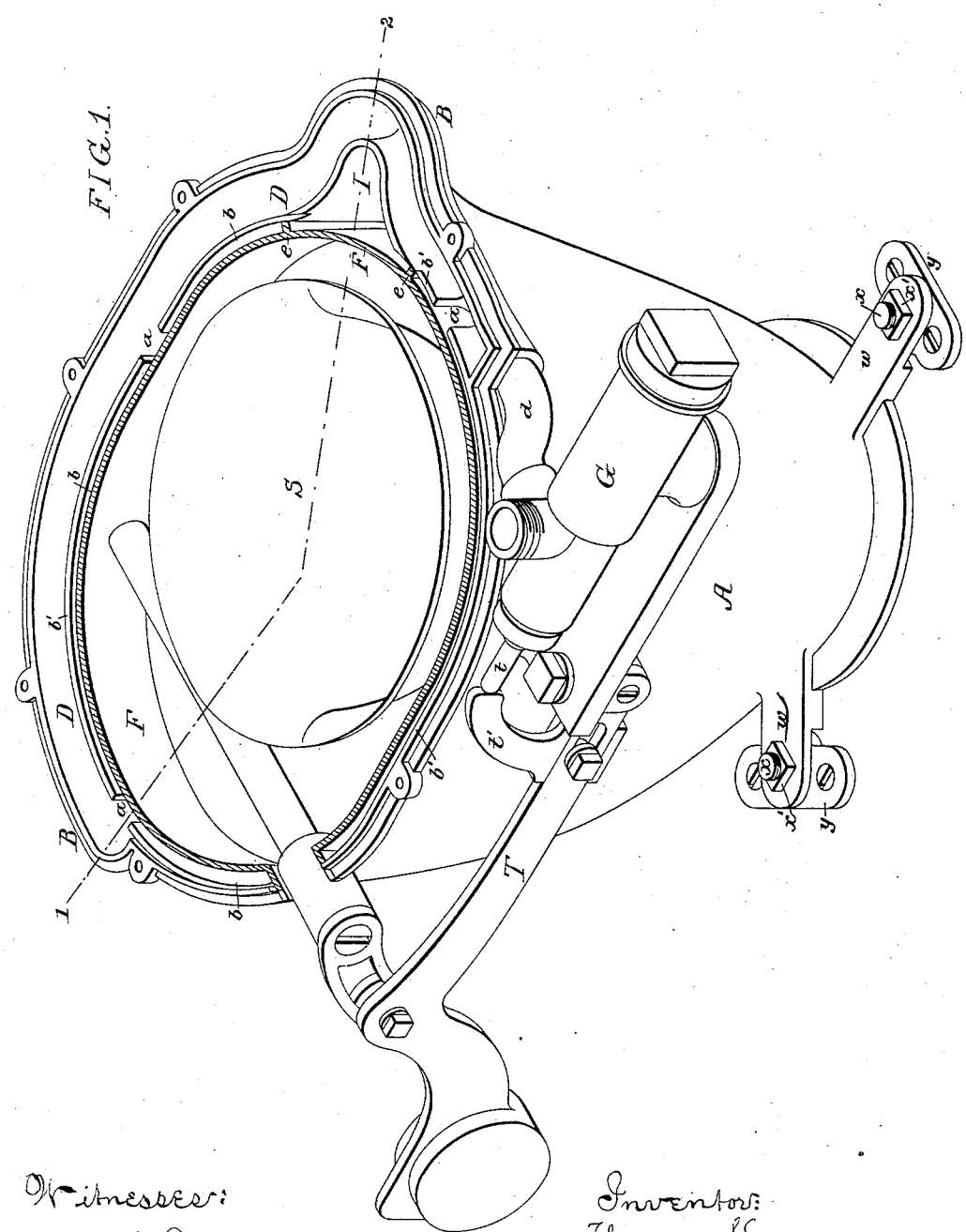

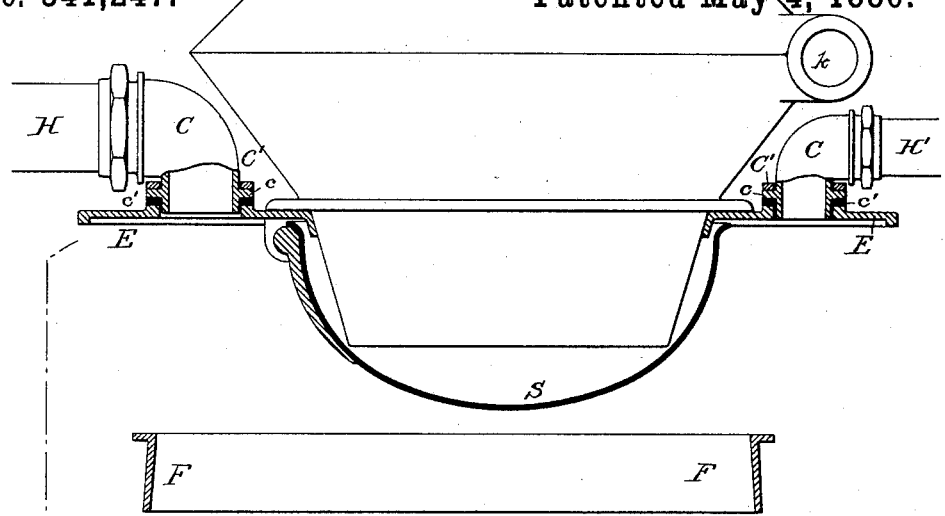
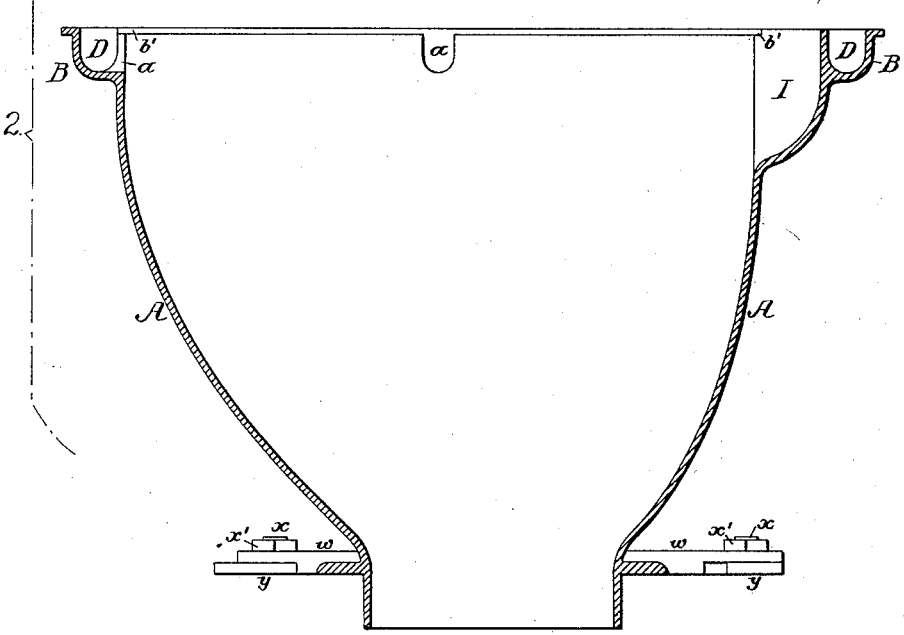

(No Model.) 3 Sheets—Sheet 3.

T. KENNEDY.
WATER CLOSET.

No. 341,247. Patented May 4, 1886.

Witnesses:
John E. Parker
Harry Drury

Inventor:
Thomas Kennedy
by his Attorneys
Howson & Son

United States Patent Office.

THOMAS KENNEDY, OF PHILADELPHIA, PENNSYLVANIA.

WATER-CLOSET.

SPECIFICATION forming part of Letters Patent No. 341,247, dated May 4, 1886.

Application filed June 8, 1885. Serial No. 168,031. (No model.)

*To all whom it may concern:*

Be it known that I, THOMAS KENNEDY, a citizen of the United States, residing in Philadelphia, Pennsylvania, have invented certain Improvements in Water-Closets, of which the following is a specification.

The objects of my invention are to facilitate the formation of the water-way in the casing of the hopper, and to construct a simple form of valve for directing a supply of water to both the bowl and hopper of the closet.

Figure 3:
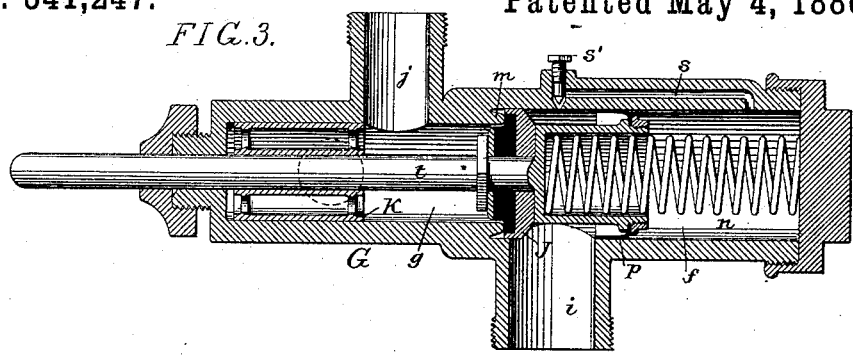
Figure 4:
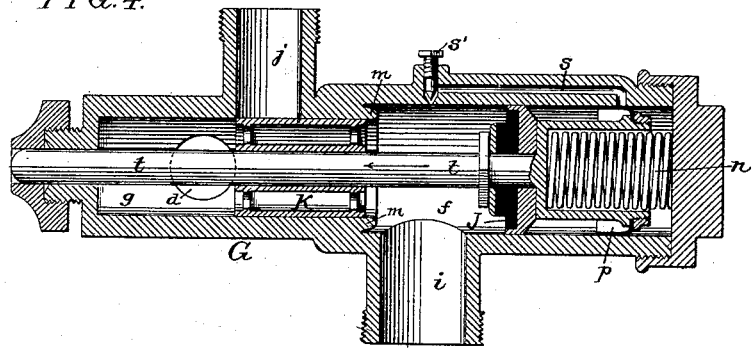
Figure 5:
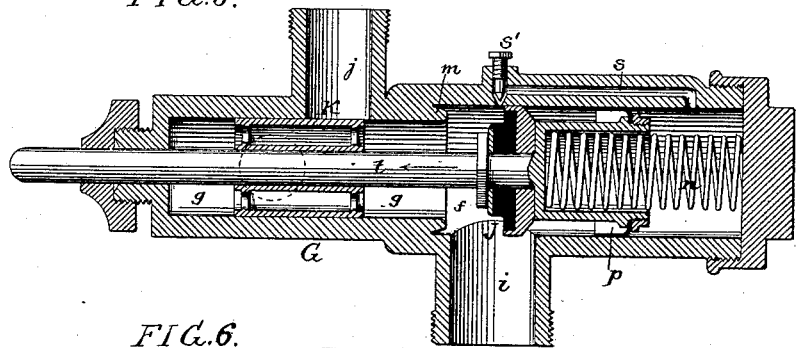
Figure 6:
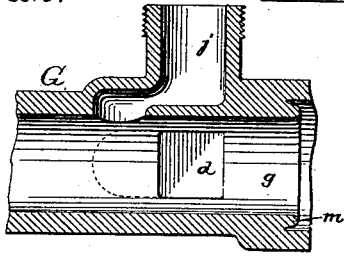

In the accompanying drawings, Figure 1 is a perspective view, partly in section, of the hopper-casing and valve-box of a water-closet constructed in accordance with my invention, the pan and the devices for operating the same and the valve-stem being also shown. Fig. 2 is a longitudinal section of the hopper-casing and pan, the bowl of the closet and portions of the ventilating-pipes being shown in elevation, and the parts of the casing being detached from each other. Figs. 3, 4, and 5 are views of the valve-casing and valve for controlling the flow of water to the bowl and hopper; and Fig. 6 is a view of part of the valve-casing, showing a modified arrangement of parts.

A represents the casing of the hopper, the lower portion of which is constructed for connection to the soil-pipe in the usual manner. Cast with and extending part way around this casing at the top is a hollow rib, B, which contains a channel, D, this channel being closed at the top by a cap-plate, E, and being in communication, through openings $a\ a$, with a chamber, $b$, contained between the casing A and an internal depending rib, F, adapted to a seat, $b'$, on said casing, the chamber $b$ being open at the bottom.

Water enters the channel D from the valve-casing G, through a pipe, $d$, and issues from said channel through the openings $a$ into the chamber $b$, from which it is discharged into the hopper, around the top of the latter, in a thin but forcible sheet, which flows down the sides of the hopper and down the back of the pan, and serves to dislodge and wash therefrom any excreta or other impurity which may be deposited thereon.

The cover-plate E of the hopper is provided with two ventilating-pipes, H H', and as the bowl is close to the hopper-casing in front it is necessary, in order to provide for the proper communication of the pipe H' with the hopper, to form an offset, I, in the casing A, as shown in Figs. 1 and 2, the rib B and its inclosed channel being carried around this offset, the entrance of water to which from the chamber $b$ is prevented by the partition-bridges $e$, as shown in Fig. 1. This plan of forming the water-way in a hollow rib integral with the casing of the hopper simplifies the construction of the closet, as it dispenses with all joints in connection with the water-way, except that between the top of the casing and the cover-plate E.

By making the deflector F in the form of a flanged ring adapted to a seat on the hopper-casing and independent of the cover-plate E, said deflector can be properly adjusted to its seat before the application of the cover-plate, and the joint between the hopper-casing and the flange of the ring can be readily made tight, and the distributing-chamber between the ring and casing properly formed without reference to the subsequent fitting of the cover-plate. The ring F and cover-plate, moreover, are both plain castings, which can be readily and cheaply produced, whereas the casting of the deflecting-ring in one piece with the cover-plate would necessitate the use of elaborate cores, and would so increase the difficulty of casting as to render the operation impracticable on account of its expense.

The valve-casing G has two bores, $f$ and $g$, one larger in diameter than the other, the inlet-branch $i$ communicating with the bore $f$, and the bore $g$ having a vertical outlet-branch, $j$, and a lateral outlet-branch, $d$. The inlet-branch $i$ communicates with any convenient source of water-supply, the vertical outlet-branch $j$ being in communication with the branch $k$ of the water-distributing chamber of the bowl, and the lateral outlet-branch $d$ communicating with the water-way D of the hopper, as before set forth.

The bore $f$ of the valve-casing contains the usual valve, J, which, by contact with a seat, $m$, at the junction of the bores $f$ and $g$, serves to cut off the flow of water to the latter, this valve being acted upon by the usual spring, $n$, and provided with the ordinary cupped washer $p$ and the casing G, having the passage $s$ and regulating set-screw $s'$, so that while the outward movement of the valve from its seat can be readily effected, owing to the yielding of the cupped washer $p$, the movement of the valve toward its seat is governed by the restricted flow of water through the passage $s$, thereby regulating the time during which the valve J is permitted to remain open, and the flow of water through the casing G continues. A valve-casing having the inlet $i$, outlet $j$, valve J, and regulating device of this character has heretofore been used in connection with water-closets, and my improvement is restricted to the means whereby the flow of water is directed first through the lateral outlet $d$ to the holder of the closet and then through the outlet $j$ to the bowl, or vice versa. This device consists of a hollow cylindrical valve, K, which is secured to the stem $t$ of the main valve J, and fits snugly to the contracted bore $g$ of the casing G.

The outlets $d$ and $j$ are out of line with each other longitudinally, and the valve K is of such length that it will about cover both outlets when in the mid position, as shown in Fig. 5.

When the valve stem $t$ is thrust inward to its full extent, as shown in Fig. 4, owing to the action thereupon of the toe $t'$ on the operating-lever T, the valve K occupies such a position that the outlet $d$ is uncovered and the outlet $j$ covered by the valve, the water entering the valve-casing consequently passing through the valve K and escaping through the lateral outlet $d$ to the water-way of the hopper. As the stem moves in the direction of the arrow, however, the valve K gradually closes the outlet $d$, and by the time the same is completely closed, as shown in Fig. 5, the valve is beginning to open the outlet $j$, through which the water passes to the bowl of the closet, the water continuing to flow through this outlet until the valve J reaches its seat, when the parts are in the position shown in Fig. 3 and the flow of water is cut off. By this means as soon as the dumping of the pan S is effected by the movement of the lever T a stream of water is directed into the hopper, so as to wash from the sides of the same, or from the bottom of the pan, any excreta or other impurity which may have been deposited thereon, this flow continuing until the stream is directed into the bowl.

If desired, the flow may be directed first to the bowl and then to the hopper, this result being effected by simply changing the relation of the outlets $d$ and $j$, as shown in Fig. 6.

I claim as my invention—

1. The combination of the hopper-casing having around the top a hollow rib, B, forming a water-way, the cover-plate E, and the internal deflector, F, made in the form of a ring independent of the cover-plate and adapted to a seat on the top of the hopper-casing, all substantially as specified.

2. The combination of the hopper-casing having at one side an offset, I, and having at the top a hollow rib inclosing a water-way and extending around said offset, with the internal deflector, F, and bridges $e$ on opposite sides of the offset, said deflector forming a distributing-chamber extending around the top of the hopper and communicating with the water-way in the hollow rib on both sides of said offset, all substantially as specified.

3. The combination of the bowl and hopper-casing, both having water-ways therein, the valve-casing G, having an inlet, $i$, and two outlets, $d$ and $j$, located side by side, a self-closing valve, J, and a hollow cylindrical valve, K, carried by the stem of the valve J, and having a water-way through it from end to end, all substantially as set forth.

In testimony whereof I have signed my name to this specification in the presence of two subscribing witnesses.

THOS. KENNEDY.

Witnesses:
GEORGE SIBSON,
HARRY SMITH.